US008768531B2

(12) United States Patent
Sonoda et al.

(10) Patent No.: US 8,768,531 B2
(45) Date of Patent: Jul. 1, 2014

(54) CENTRALIZED MONITORING APPARATUS

(75) Inventors: Yasuaki Sonoda, Oizumi-machi (JP);
Masanaga Tanaka, Oizumi-machi (JP);
Ikue Nono, Oizumi-machi (JP);
Shigeyuki Nakamura, Oizumi-machi (JP)

(73) Assignee: Panasonic Healthcare Co., Ltd., Toon-shi (JP)

( * ) Notice: Subject to any disclaimer, the term of this patent is extended or adjusted under 35 U.S.C. 154(b) by 526 days.

(21) Appl. No.: 12/709,068

(22) Filed: Feb. 19, 2010

(65) Prior Publication Data

US 2010/0206540 A1    Aug. 19, 2010

(30) Foreign Application Priority Data

Feb. 19, 2009  (JP) ................................. 2009-036937

(51) Int. Cl.
| | | |
|---|---|---|
| F24F 11/04 | (2006.01) | |
| F25B 29/00 | (2006.01) | |
| F25D 23/12 | (2006.01) | |
| F28F 13/00 | (2006.01) | |
| F28F 27/00 | (2006.01) | |
| G01K 3/00 | (2006.01) | |
| G05D 23/00 | (2006.01) | |
| G05D 23/19 | (2006.01) | |

(52) U.S. Cl.
USPC .............. 700/300; 700/9; 700/14; 700/15; 700/17; 700/28; 700/33; 700/45; 700/83; 165/200; 165/201; 165/236; 165/244; 165/253; 165/260; 165/267; 165/268; 236/46 R; 702/130

(58) Field of Classification Search
USPC ........... 700/9, 14, 15, 17, 33, 45, 300, 28, 83; 165/200, 201, 238, 244, 253, 260, 267; 165/268; 236/46 R; 702/130
See application file for complete search history.

(56) References Cited

U.S. PATENT DOCUMENTS 4,412,292 A * 10/1983 Sedam et al. ................ 700/241
4,621,336 A * 11/1986 Brown ......................... 700/278
(Continued)

FOREIGN PATENT DOCUMENTS

JP         6-88666 A       3/1994
JP         9-236368 A      9/1997
(Continued)

OTHER PUBLICATIONS

Japanese Office Action dated Feb. 12, 2013, issued in corresponding Japanese Patent Application No. 2009-036937.

*Primary Examiner* — Mohammad Ali
*Assistant Examiner* — Jennifer L Norton
(74) *Attorney, Agent, or Firm* — Westerman, Hattori, Daniels & Adrian, LLP (57) ABSTRACT

A centralized-monitoring apparatus, which centralized monitors a device including a storage, a temperature sensor to detect a temperature therein, and a temperature-variable device to cool or heat inside the storage such that the temperature reaches a set object-preservation temperature, comprises: an input device to be input with first information indicative of a time zone in which the temperature-variable device performing power-saving operation and second information indicative of a set temperature of the time zone; a storage device to store the first-and-second information from the input device; a timing device to measure a current time; and a control device to control the temperature-variable device, based on the first-and-second information and current time, so as to start operation of turning the temperature to the set temperature when the current time reaches a starting time of the time zone, and terminate the operation when the current time reaches an ending time thereof.

2 Claims, 7 Drawing Sheets

(56) References Cited

U.S. PATENT DOCUMENTS

| | | | |
|---|---|---|---|
| 4,799,176 A * | 1/1989 | Cacciatore | 700/278 |
| 4,881,686 A * | 11/1989 | Mehta | 236/46 R |
| 5,282,127 A * | 1/1994 | Mii | 700/1 |
| 5,682,949 A * | 11/1997 | Ratcliffe et al. | 165/209 |
| 6,134,667 A * | 10/2000 | Suzuki et al. | 713/300 |
| 6,427,772 B1 * | 8/2002 | Oden et al. | 165/232 |
| 7,752,856 B2 * | 7/2010 | Senba et al. | 62/157 |
| 2004/0254654 A1 * | 12/2004 | Donnelly et al. | 700/22 |
| 2005/0010434 A1 * | 1/2005 | Sasajima et al. | 705/1 |
| 2005/0150948 A1 * | 7/2005 | Sato et al. | 235/381 |
| 2007/0131763 A1 * | 6/2007 | Sato | 235/381 |
| 2007/0163773 A1 * | 7/2007 | Webb et al. | 165/254 |
| 2007/0194138 A9 * | 8/2007 | Shah | 236/46 R |
| 2008/0046113 A1 * | 2/2008 | Tedesco et al. | 700/213 |
| 2008/0077275 A1 * | 3/2008 | Merwarth et al. | 700/240 |
| 2009/0032605 A1 * | 2/2009 | Sullivan et al. | 236/46 R |
| 2009/0140064 A1 * | 6/2009 | Schultz et al. | 236/51 |
| 2011/0029139 A1 * | 2/2011 | Altonen et al. | 700/278 |

FOREIGN PATENT DOCUMENTS

| | | |
|---|---|---|
| JP | 2002-41138 A | 2/2002 |
| JP | 2002303478 A | 10/2002 |
| JP | 2005337653 A | 12/2005 |
| JP | 2009-3788 A | 1/2009 |

* cited by examiner

| COOLING STORAGE – CHANNEL | ECO-MODE OPERATION TIME ZONE | | SET TEMPERATURE OF ECO-MODE OPERATION [DEGREE C] |
| --- | --- | --- | --- |
| | STARTING TIME | ENDING TIME | |
| A-2 (INTERIOR TEMPERATURE OF COOLING STORAGE A) | 22 O'CLOCK | 30 O'CLOCK | −75 |
| B-2 (INTERIOR TEMPERATURE OF COOLING STORAGE B) | 22 O'CLOCK | 32 O'CLOCK | −70 |
| C-2 (INTERIOR TEMPERATURE OF COOLING STORAGE C) | 23 O'CLOCK | 32 O'CLOCK | −75 |
| ..... | ..... | ..... | ..... |

| NUMBER | COMBINATION OF GRAPHS |
|---|---|
| 1 | A-1 (CASCADE TEMPERATURE OF COOLING STORAGE A)<br>A-2 (INTERIOR TEMPERATURE OF COOLING STORAGE A)<br>A-3 (AMBIENT TEMPERATURE OF COOLING STORAGE A) |
| 2 | A-2 (INTERIOR TEMPERATURE OF COOLING STORAGE A)<br>B-2 (INTERIOR TEMPERATURE OF COOLING STORAGE B)<br>C-2 (INTERIOR TEMPERATURE OF COOLING STORAGE C) |
| ...... | ...... |

| NUMBER | PLAN VIEW |
|---|---|
| 1 | FIRST-FLOOR PLAN VIEW |
| 2 | SECOND-FLOOR PLAN VIEW |
| 3 | THIRD-FLOOR PLAN VIEW |
| ...... | ...... |

CENTRALIZED MONITORING APPARATUS

CROSS-REFERENCE TO RELATED APPLICATION

This application claims the benefit of priority to Japanese Patent Application No. 2009-036937, filed Feb. 19, 2009, of which full contents are incorporated herein by reference.

BACKGROUND OF THE INVENTION

1. Field of the Invention

The present invention relates to a centralized monitoring apparatus.

2. Description of the Related Art

Preservation equipment is known that includes a temperature variable device that cools or heats the inside of a storage such that the temperature within the storage reaches a set temperature for preserving a preservation object. To detect failure, etc., of the temperature variable device of the preservation equipment, a centralized monitoring apparatus is disclosed that monitors the temperature within the storage detected by a temperature sensor to determine presence of failure, etc., by comparing the detected temperature with a set temperature (e.g., Japanese Patent Application Laid-Open Publication No. 6-088666).

If the preservation equipment is, for example, a cooling storage, a refrigerating circuit is included as the temperature variable device to cool the inside of the storage to a set temperature, and in the case of, for example, a culture apparatus, a heater is included as the temperature variable device to heat the inside of a culture chamber to a set temperature.

When a door of a storage is opened for taking out and putting in a preservation object, since a load is generated in accordance with a temperature difference between the inside and the outside of the storage and the load has an effect in the direction bringing the temperature within the storage closer to the temperature outside the storage, the set temperature within the storage is set on the basis that such a load is generated at a predetermined frequency, for example.

Since disturbance such as opening and closing of the door of the storage have different frequency distributions in a day, for example, depending on a usage pattern of the preservation equipment, it is desirable for the electric power saving of the temperature variable device that the set temperature within the storage is increased and decreased within a range not affecting the preservation of the preservation object, for example. However, since the set temperature is fixed in the above preservation equipment on the basis of certain disturbance, it is problematic that electric power is wastefully consumed by the temperature variable device operating at the fixed set temperature at the timing when the effect of disturbance is not so great, for example.

On the other hand, since the main purpose of the above centralized monitoring apparatus is detection and notification of failure, etc., the maintenance of the set temperature within the storage is individually be performed by the preservation equipment and the centralized monitoring apparatus is not involved with such control, absent failure. Therefore, the above power consumption problem remains unsolved.

SUMMARY OF THE INVENTION

A centralized monitoring apparatus according to an aspect of the present invention, for performing centralized monitoring through a communication line for a device to be monitored such as preservation equipment, the device including a storage for storing a preservation object, a temperature sensor configured to detect a temperature within the storage, and a temperature variable device configured to cool or heat an inside of the storage with reference to the detected temperature of the temperature sensor such that the temperature within the storage reaches a set temperature for preserving the preservation object, the centralized monitoring apparatus comprising: an input device configured to be input with first information indicative of a second time zone and second information indicative of a set temperature of the second time zone, the temperature variable device performing power saving operation in the second time zone as compared to operation in a first time zone; a storage device configured to store the first information and the second information from the input device; a timing device configured to measure a current time; and a control device configured to control the temperature variable device through the communication line, based on the first information and the second information stored in the storage device and on the current time measured by the timing device, such that the temperature variable device starts operation of turning the temperature within the storage to the set temperature of the second time zone when the current time reaches a starting time of the second time zone, and that the temperature variable device terminates the operation of turning the temperature within the storage to the set temperature of the second time zone when the current time reaches the ending time of the second time zone.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
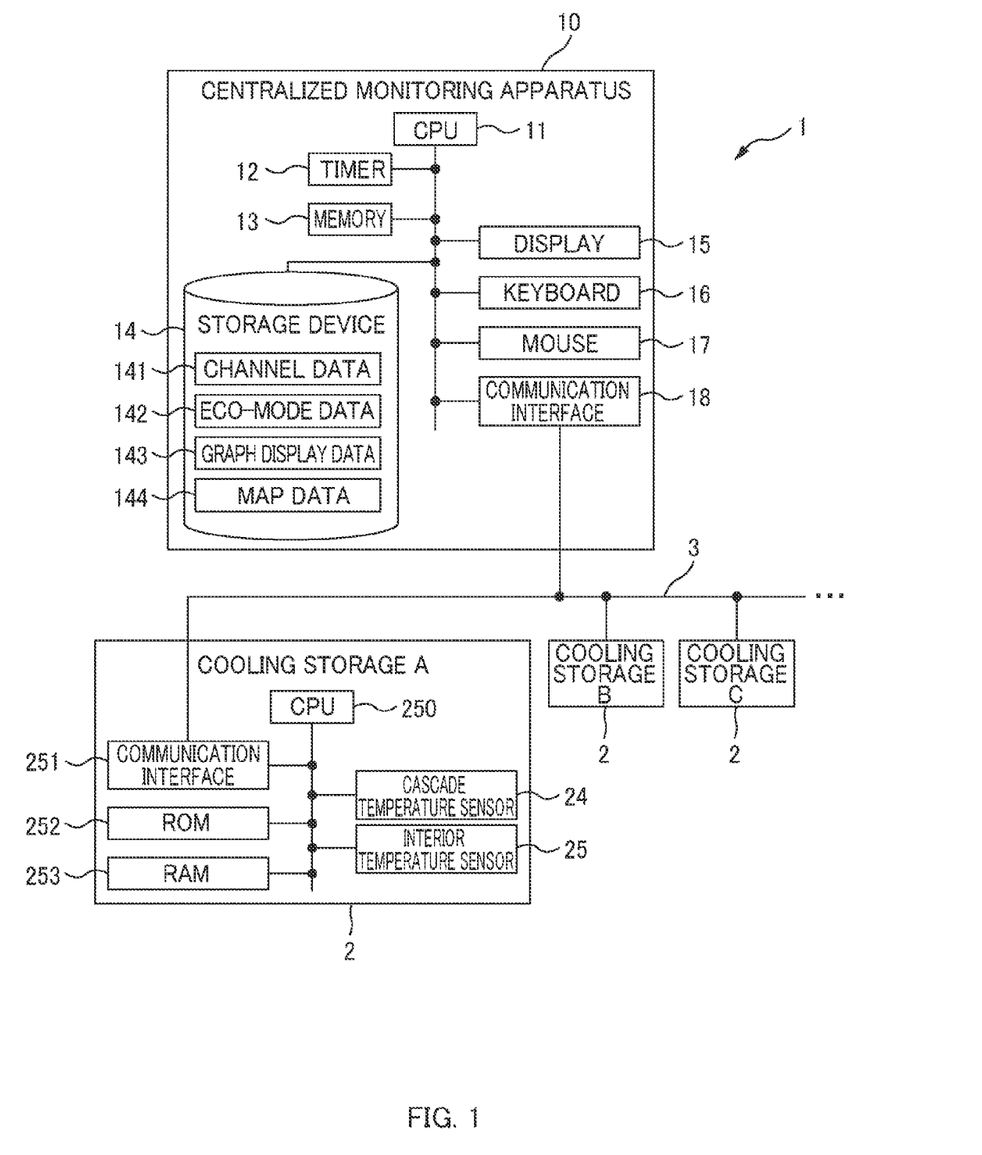
FIG. 1 is a block diagram of an example of a centralized monitoring system of an embodiment.
Figure 2:
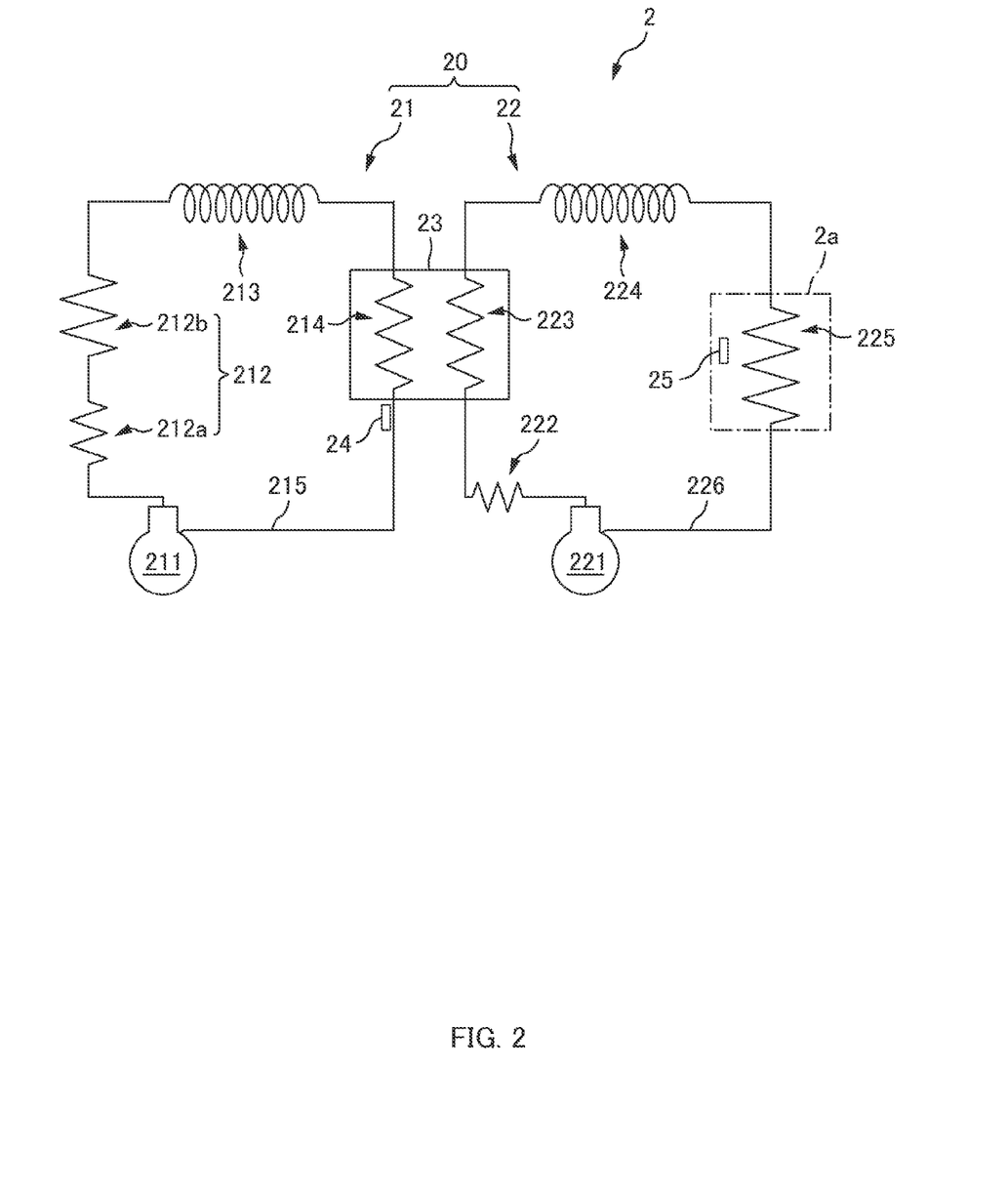
FIG. 2 is a circuit diagram of an example of a refrigerating circuit of the embodiment.
Figure 3:
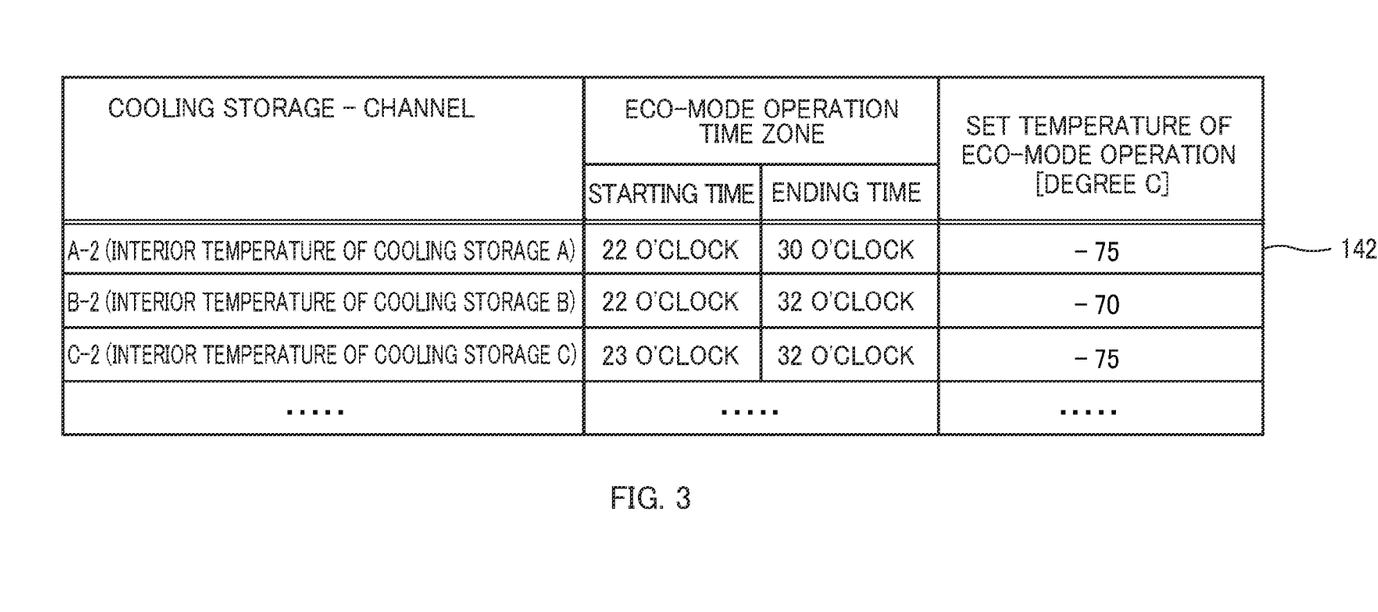
FIG. 3 is a chart of an exemplary configuration of eco-mode data of the embodiment.
Figure 4:
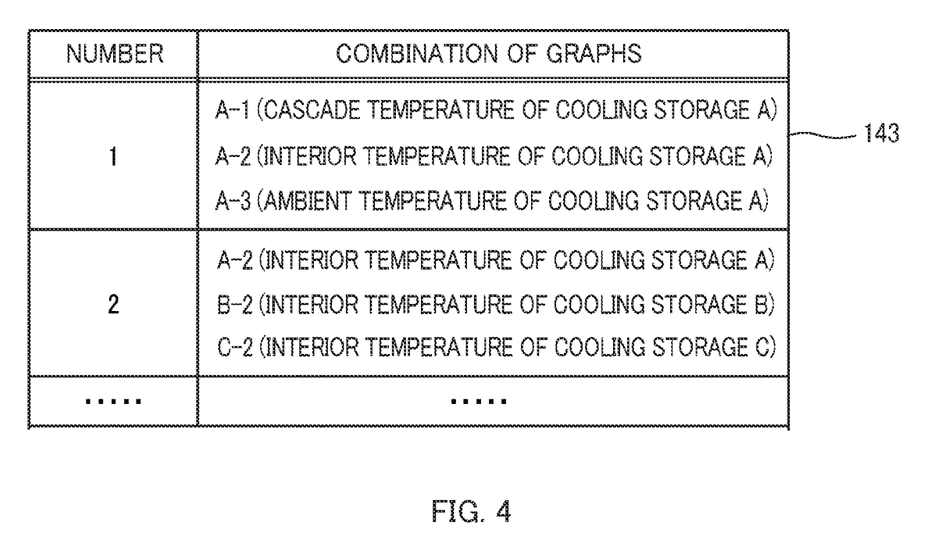
FIG. 4 is a chart of an exemplary configuration of graph display data of the embodiment.

A centralized monitoring apparatus 10 of an embodiment will be described with reference to FIGS. 1 to 8. FIG. 1 is a block diagram of an example of the centralized monitoring system 1 of the embodiment. FIG. 2 is a circuit diagram of an example of a refrigerating circuit 20 of the embodiment. FIG. 3 is a chart of an exemplary configuration of eco-mode data 142 of the embodiment. FIG. 4 is a chart of an exemplary configuration of graph display data 143 of the embodiment.

Figure 5:
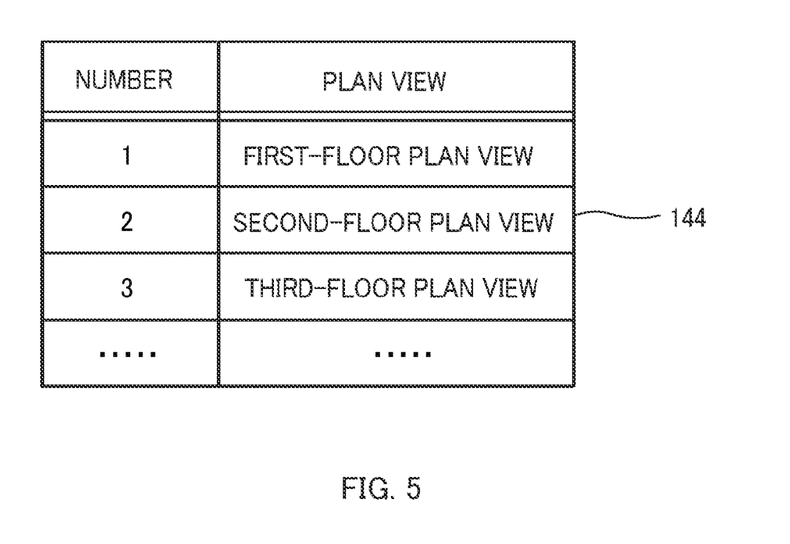
FIG. 5 is a chart of an exemplary configuration of map data of the embodiment.
Figure 6:
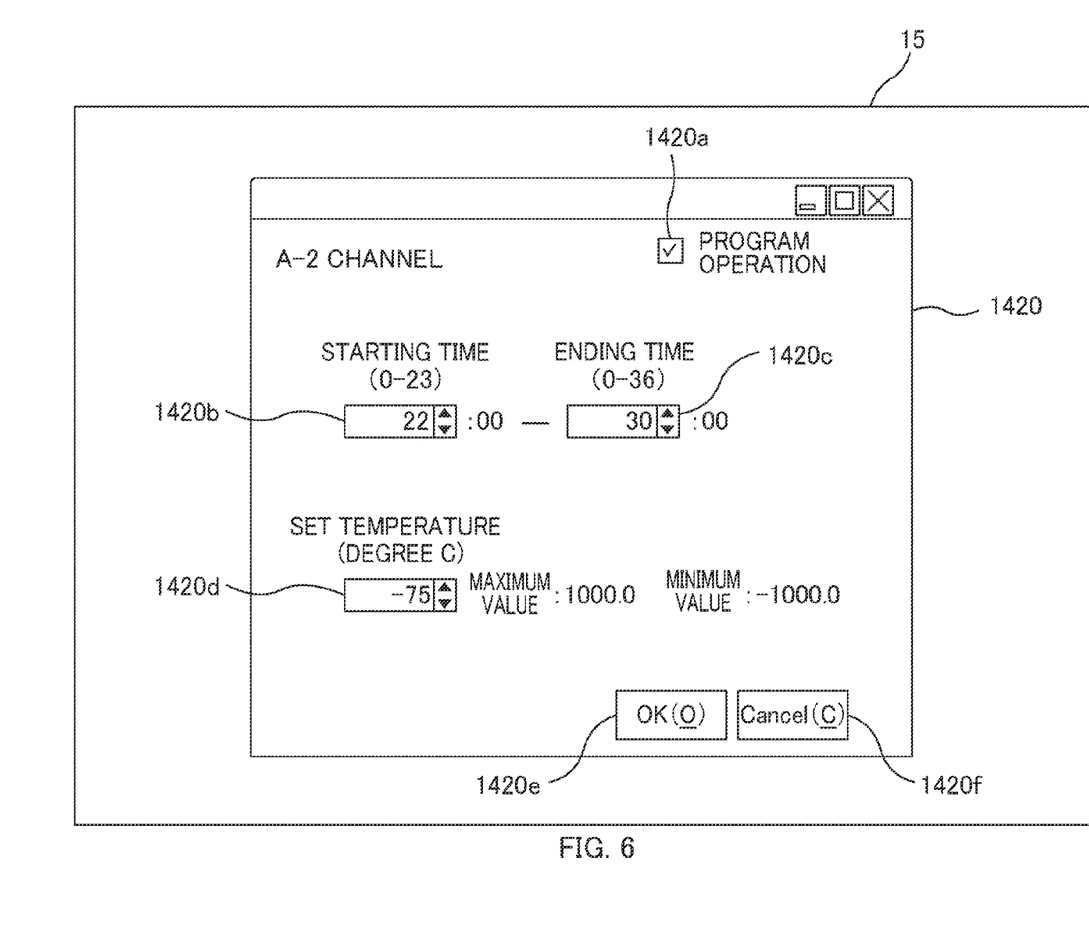
FIG. 6 is a schematic of an example of eco-mode setting screen of the embodiment.
Figure 7:
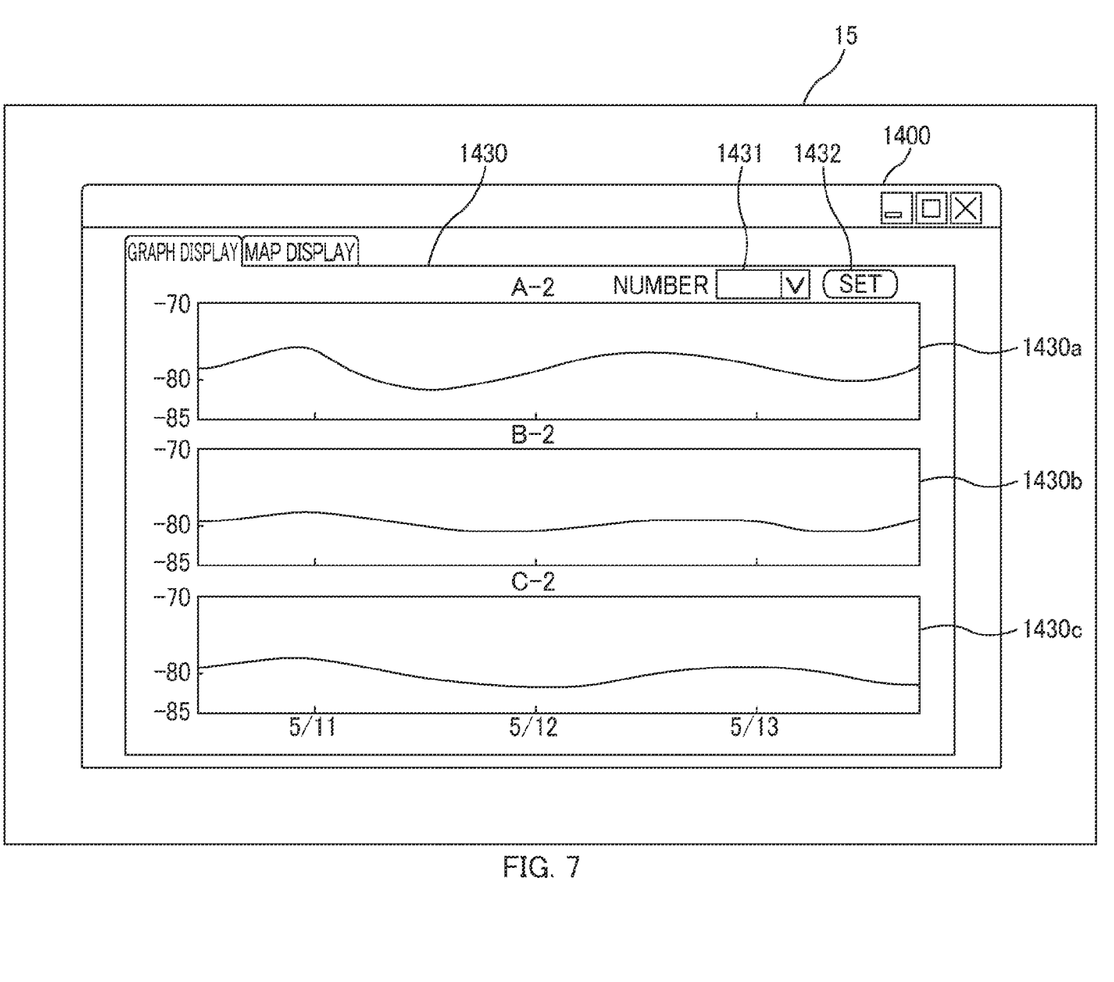
FIG. 7 is a schematic of an example of a graph display area of a display screen of the embodiment.
Figure 8:
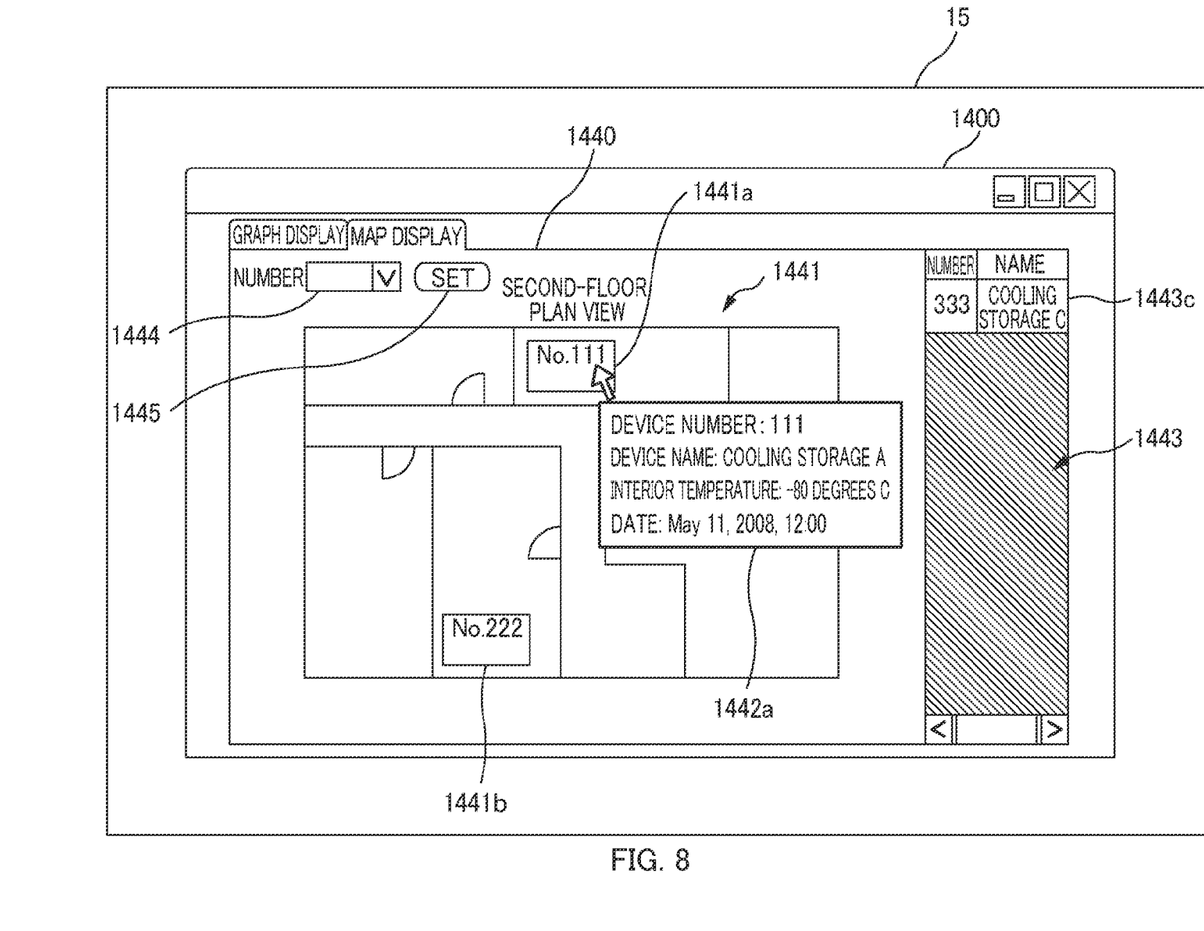
FIG. 8 is a schematic of an example of a map display area of a display screen of the embodiment.

FIG. 5 is a chart of an exemplary configuration of map data 144 of the embodiment. FIG. 6 is a schematic of an example of eco-mode setting screen 1420 of the embodiment. FIG. 7 is a schematic of an example of a graph display area 1430 of a display screen 1400 of the embodiment. FIG. 8 is a schematic of an example of a map display area 1440 of the display screen 1400 of the embodiment.

As depicted in FIG. 1, the centralized monitoring apparatus 10 is communicably connected to cooling storages A, B, C, etc., (collectively referred to as a "cooling storage 2"), for example, through a communication line 3 such as LAN (Local Area Network) to make up a centralized monitoring system 1. In this embodiment, a plurality of cooling storages 2 is disposed in a distributed manner in respective rooms within, for example, a facility such as a laboratory and the one centralized monitoring apparatus 10 is disposed inside or outside of the facility.

Cooling Storage

As depicted in FIG. 1, the cooling storage (preservation equipment) 2 includes a refrigerating circuit (temperature variable device) 20, a CPU 250, a communication interface 251, a ROM 252, a RAM 253, a cascade temperature sensor 24, and an interior temperature sensor (temperature sensor) 25 described below.

The CPU 250 executes predetermined processes such as operation control of the refrigerating circuit 20. The communication interface 251 is connected to the communication line 3 to transmit/receive data (such as information of channel and information of set temperature described later). The ROM 252 stores a program defining the process procedures of the CPU 250, etc. The RAM 253 stores data used for the processes of the CPU 250, etc., and may be a non-volatile memory such as a flash ROM. The cascade temperature sensor 24 is, for example, a thermistor or a thermocouple that detects the temperature of a cascade condenser 23 described later (referred to as "cascade temperature"). The interior temperature sensor 25 is, for example, a thermistor or a thermocouple that detects the temperature (referred to as "interior temperature") of the inside of an inner box 2a (referred to as "interior portion") described later.

As depicted in FIG. 2, the refrigerating circuit 20 of the embodiment is a binary refrigerating circuit using two refrigerants with different boiling points and includes a higher-temperature refrigerating circuit 21 that encloses a refrigerant with a higher boiling points and a lower-temperature refrigerating circuit 22 that encloses a refrigerant with a lower boiling points. However, the refrigerating circuit 20 is not limited to such a binary refrigerating circuit and may be any cooling means that basically cools the interior portion.

The higher-temperature refrigerating circuit 21 is made up of a compressor 211, a condenser 212, a capillary tube 213, and an evaporator 214, which are annularly connected through a refrigerant pipe 215, and the lower-temperature refrigerating circuit 22 is made up of a compressor 221, a condenser 223, a capillary tube 224, and an evaporator 225, which are annularly connected through a refrigerant pipe 226. In the higher-temperature refrigerating circuit 21, the condenser 212 is made up of a condenser 212b and a precondenser 212a for causing the refrigerant to radiate heat in advance on the preceding stage of the condenser 212b. The lower-temperature refrigerating circuit 22 is provided with a precondenser 222 for causing the refrigerant to radiate heat in advance on the preceding stage of the condenser 223.

The evaporator 214 and the condenser 223 are mutually arranged in a heat-exchangeable manner to make up the cascade condenser 23. The evaporator 225 is thermally connected with an outer surface of the inner box 2a that contains a preservation object between an outer box and the inner box (container) making up the storage to cool the interior portion through the evaporation effect of the lower-boiling-point refrigerant. In FIG. 2, the evaporator 225 and the inner box 2a are depicted in an overlapped manner for the convenience of illustration. The cascade temperature sensor 24 is provided in the vicinity of the outlet of the evaporator 214 making up the cascade condenser 23, for example, and the interior temperature sensor 25 is provided at a predetermined position within the interior portion.

When receiving information of the set temperature from the centralized monitoring apparatus 10, the cooling storage 2 with the above configuration stores the received information in the RAM 253 and control, for example, the on/off state of the compressors 211 and 221 of the refrigerating circuit 20 such that a detected temperature of the interior temperature sensor 25 reaches the set temperature stored in the RAM 253. The cooling storage 2 autonomously or upon request transmits information such as a detected temperature of the cascade temperature sensor 24 and a detected temperature of the interior temperature sensor 25 to the centralized monitoring apparatus 10 at predetermined time intervals.

Centralized Monitoring Apparatus

As depicted in FIG. 1, the centralized monitoring apparatus 10 is an information processing apparatus including a CPU 11 and a memory 13 (that correspond to a control device), a timer (a timing device) 12, a storage device 14, a keyboard 16 and a mouse 17 (that correspond to an input device) to monitor and control the operational states of the refrigerating circuits 20 of a plurality of the cooling storages 2, which are the monitored devices. The centralized monitoring apparatus 10 further includes a display (a displaying device) 15 and a communication interface 18. The monitoring of the operational state described above is to receive information such as a cascade temperature and an interior temperature (collectively referred to as "channel") of each of a plurality of the cooling storages 2, to store the received channel information into the storage device 14, and to display the channel information stored in the storage device 14 on the display 15, for example. The control of the operational state described above is to read the information of the set temperature of each of a plurality of the refrigerating circuits 20 at predetermined timing from the storage device 14 and to transmit the read information to the corresponding cooling storage 2, for example. The channel information is not limited to the cascade temperature, the interior temperature, etc., and may be information indicative of the operational state of the cooling storage 2 or information such as ambient temperature.

The CPU 11 executes predetermined processes for the monitoring, the control, etc., of the operational states of the refrigerating circuits 20 and the memory 13 stores a program defining the process procedures of the CPU 11, etc. The timer 12 measures the current time. The display 15 displays the channel information stored in the storage device 14. The keyboard 16 and the mouse 17 are means for entering a display request for the channel information and the set temperature information, etc. The communication interface 18 is connected to the communication line 3 to transmit/receive data (such as the channel information and the set temperature information).

The storage device 14 stores channel data 141. The channel data 141 is data that correlates the channel information and the reception time thereof for each of the cooling storages 2.

The channel data 141 may have information such as attributes of the respective cooling storages 2 in addition to the device names and the device numbers (e.g., "111", "222", and "333" for the cooling storages A, B, and C, respectively) acting as information for identifying the respective cooling storages 2.

The storage device 14 stores eco-mode data 142, graph display data 143, and map data 144 described below.

Eco-Mode Data

As depicted in FIG. 3, the eco-mode data 142 is data that correlates information (first information) indicative of a time zone (second time zone) of the eco-mode operation (power saving operation) and information (second information) indicative of the set temperature at the time of the eco-mode operation with the information for identifying a channel of the cooling storage 2 (e.g., "A-2"). A time zone of the eco-mode operation is defined by a starting time and an ending time of the operation. The channel set as the set temperature related to the eco-mode operation is the interior temperature.

In this embodiment, the time zones of the day are divided as two time zones of an eco-mode operation time zone and a normal-mode operation time zone (first time zone), and the eco-mode operation time zone and the set temperature of the time zone may be entered by operating the keyboard 16, the mouse 17, etc., on the centralized monitoring apparatus 10 as described later. The information of the set temperature in the normal-mode operation time zone is separately entered in advance and stored in the storage device 14 as data not shown, for example.

In the exemplary illustration of FIG. 3, the interior temperature of the cooling storage A is defined as the set temperature of −75 degrees C. in the time zone from 22 o'clock of the day to 6 o'clock (i.e., (30-24) o'clock) of the next day.

Base on this data, the centralized monitoring apparatus 10 refers to the timer 12, for example, at predetermined time intervals, transmits to the cooling storage A the information of the set temperature (−75 degrees C.) at the time of the eco-mode operation if it is determined that the current time measured by the timer 12 reaches 22 o'clock, and transmits to the cooling storage A the information of the set temperature (−76 degrees C., e.g., lower only by 1 degree C. than −75 degrees C.) of the normal-mode operation if it is determined that the current time measured by the timer 12 reaches 6 o'clock. On the other hand, each time the new set temperature information is received from the centralized monitoring apparatus 10, the cooling storage A updates the set temperature stored in the RAM 253 to the new set temperature and controls the on/off states of the compressors 211 and 221 of the refrigerating circuit 20 such that the detected temperature of the interior temperature sensor 25 reaches the new set temperature stored in the RAM 253.

The above example is a setting example when a time zone with a higher frequency of opening/closing the door of the cooling storage A is from 6 o'clock of the day to 22 o'clock of the same day and a time zone with a lower frequency of opening/closing the door of the cooling storage A is from 22 o'clock of the day to 6 o'clock of the next day; the former time zone is set as the normal-mode operation time zone with the set temperature of −76 degrees C.; and the latter time zone is set as the eco-mode operation time zone with the set temperature of −75 degrees C. Since the disturbance such as opening and closing of the door acts as a load on the refrigerating circuit 20, by setting the set temperature of the time zone with small disturbance (the eco-mode operation time zone) higher than the set temperature of the time zone with large disturbance (the normal-mode operation time zone), the refrigerating circuit 20 may be constrained from operating in the time zone with smaller disturbance in accordance with the set temperature determined on the basis of larger disturbance, for example, and electric power saving may be achieved as a result. −75 degrees C. defined relative to −76 degrees C. is an experimental value, etc., determined in advance based on difference of expected respective disturbances, etc., in the normal-mode operation time zone and the eco-mode operation time zone.

As depicted in FIG. 6, the eco-mode data 142 is preliminarily generated based on data entered by operating the keyboard 16, the mouse 17, etc., with reference to the eco-mode setting screen 1420 displayed on the display 15 in the centralized monitoring apparatus 10 and is stored in the storage device 14.

The eco-mode setting screen 1420 displayed on the display 15 includes, for example, a check box 1420a for setting whether the eco-mode operation ("program operation") is performed in relation to the interior temperature ("A-2") of the cooling storage A, an entry field 1420b for setting the starting time of the eco-mode operation within a range of 0 o'clock to 23 o'clock, an entry field 1420c for setting the ending time of the eco-mode operation within a range of 0 o'clock to 36 o'clock, an entry field 1420d for setting the set temperature at the time of the eco-mode operation in degree C., an "OK" button 1420e for storing the information set on the screen 1420 and stored in temporary storage area (not shown) into the storage device 14, and a "Cancel" button for erasing the information from the temporary storage area.

Input values entered respectively to the starting time entry field 1420b and the ending time entry field 1420c will hereinafter supplementarily be described.

If the eco-mode operation time zone is set, for example, within a range of 0 o'clock to 24 o'clock of the same day, any one integer number of 0 to 23 is entered into the starting time entry field 1420b and an integer number greater than the input value of the entry field 1420b and not greater than 24 is entered into the ending time entry field 1420c (e.g., the starting time is set to "0" o'clock and the ending time is set to "8" o'clock).

If the eco-mode operation time zone is set across the continuing two days, any one integer number of 0 to 23 is entered into the starting time entry field 1420b and an integer number not smaller than 25 and not greater than the upper limit of 36 is entered into the ending time entry field 1420c (e.g., the starting time is set to "22" o'clock and the ending time is set to "32" o'clock (i.e., 8 o'clock of the next day)).

As above, for example, an administrator can efficiently enter the eco-mode operation time zones and the set temperatures of the time zones respectively for a plurality of the cooling storages 2 with reference to the eco-mode setting screen 1420 displayed on the display 15 of the centralized monitoring apparatus 10 by operating the keyboard 16, the mouse 17, etc., of the apparatus 10.

Graph Display Data

As depicted in FIG. 4, the graph display data 143 is data that correlates combinations of pieces of information identifying the channels of the cooling storages 2 with information identifying the combinations (e.g., number information). In this embodiment, the combinations are for, for example, an administrator preliminarily registering a plurality of channels frequently used when variations overtime are viewed at a glance on the one display 15 (e.g., "registration of favorites").

In the exemplary illustration of FIG. 4, a combination of the cascade temperature ("A-1"), the interior temperature ("A-2"), and the ambient temperature ("A-3") in the same cooling storage A is registered as the number "1". In the exemplary illustration of FIG. 4, a combination of the same channels (interior temperatures) of the cooling storage A ("A-2"), the cooling storage B ("B-2"), and the cooling storage C ("C-3") is registered as the number "2".

In this embodiment, the graph display data 143 is preliminarily be generated based on data entered by operating the keyboard 16, the mouse 17, etc., with reference to a predetermined menu screen (not shown) displayed on the display 15 in the centralized monitoring apparatus 10 and is stored in the storage device 14. The predetermined menu screen is configured to display all (or preliminarily registered) pieces of the information identifying the channels of the cooling storages 2 in the channel data 141 to enable selection of channels desired to be displayed at a glance from the channels, for example.

The graph display area 1430 in the display screen 1400 depicted in FIG. 7 displays the channel data 141 corresponding to a plurality of channels registered in the graph display data 143 (FIG. 4) as a plurality of graphs 1430a, 1430b, and 1430c in a row, which are, for example, line graphs with the horizontal axis of timing (time) and the vertical axis of temperature.

For the administrator operating the mouse 17, etc., for the above display, the graph display area 1430 is provided with an entry field 1431 for selecting the relevant number from the numbers registered in the graph display data 143 and a setting button 1432 for setting the number selected in the entry field 1431. When the setting button 1432 is clicked after the relevant number is selected in the entry field 1431, the information of the number is transmitted to the CPU 11. When receiving the information of the number, the CPU 11 reads the channel data 141 corresponding to the received number from the graph display data 143 to display a plurality of the graphs 1430a, 1430b, and 1430c in the graph display area 1430.

When monitoring the operational states of cooling storages (e.g., variations of channels over time) in a conventional centralized monitoring apparatus, for example, an administrator repeats the operation of a keyboard, etc., by the number of the channels to be monitored to acquired desired information. This leads to poor working efficiency for an administrator who has to monitor a plurality of cooling storages. Since the same workload is applied when variations over time are monitored for a plurality of channels (such as a cascade temperature, an interior temperature, and ambient temperature) of one cooling storage, if the number of channels to be monitored is narrowed down to alleviate the burden, it may become difficult to keep the accuracy of the monitoring.

However, in accordance with the centralized monitoring apparatus 10 of the embodiment, an administrator is able to view how a plurality of channels varies over time at a glance on the one display 15, the one cooling storage 2 may be monitored in various aspects for a plurality of channels or a plurality of cooling storages 2 may concurrently be monitored for one channel to improve the monitoring accuracy of the cooling storages 2. Since a plurality of the channels frequently viewed at a glance may be registered in advance, the administrator is able to improve the monitoring efficiency of the cooling storages 2 by quickly display a graph of the registered channels on the display 15.

Map Data

As depicted in FIG. 5, the map data 143 is image information of plan views of a facility such as a laboratory with a plurality of the cooling storages 2 disposed. In the exemplary illustration of FIG. 5, the map data 143 includes image information of plan views of floors within a facility (such as "first-floor plan view", "second-floor plan view", and "third-floor plan view") for each piece of information identifying the image information (e.g., number information).

The map display area 1440 of the display screen 1400 depicted in FIG. 8 includes an image area 1441 and a list area 1443. The image area 1441 displays the image information (e.g., second-floor plan view of the facility) preliminarily registered in the map data (FIG. 5). The list area 1443 displays the information identifying the cooling storage 2 in the channel data (e.g., an icon 1443c indicative of the cooling storage C).

For example, for the administrator operating the mouse 17, etc., for the above display, the map display area 1440 is provided with an entry field 1444 and a setting button 1445. The entry field 1444 is a field for selecting the relevant number from the numbers registered in the map data 144 and the setting button 1445 is a button for setting the number selected in the entry field 1444. When the setting button 1445 is clicked after the relevant number is selected in the entry field 1444, the information of the number is transmitted to the CPU 11. When receiving the information of the number, the CPU 11 reads and displays the image information corresponding to the received number from the map data 144 on the image area 1441.

The icon 1443c indicative of, for example, the cooling storage C displayed on the list area 1443 displays a device name "cooling storage C", the device number "333" thereof, etc. The icon 1443c indicative of the cooling storage C may be moved and disposed at an arbitrary position on the image area 1441 by the drag and drop operation of the mouse 17. As above, this embodiment has a map display function for overlapping and displaying an icon of a monitored device on the floor view (map) of the facility.

An icon 1441a indicative of, for example, the cooling storage A displayed on the image area 1441 displays a relevant device number "111", etc., and exhibits the dimensions and shape fitted into each room within the facility displayed in the image area 1441. The icon 1441a has been moved and disposed from the list area 1443 by the drag and drop operation of the mouse 17. The dimensions of the icon 1441a are settable to a plurality of types of dimensions (e.g., Small, Medium, and Large) depending on a size of each room displayed on the image area 1441, for example. By disposing the icon 1441a at a position on the image area 1441 corresponding to the actual disposition location of the relevant cooling storage A, the administrator may visually comprehend a relationship between the cooling storage A and the disposition location in an easier manner. This improves the monitoring efficiency at the time of the centralized monitoring of the cooling storages 2. Since the dimensions of the icon 1441a may be changed depending on the area of the image area 1441 corresponding to the room with the cooling storage A disposed such that the icon is fitted into the room, the monitoring efficiency may be constraining from deteriorating even if the number of the cooling storages 2 is large or if the room arrangement of the facility is complicated, for example.

When the mouse 17 is operated to point the cursor on the display 15 to the icon 1441a, a balloon 1442a is displayed to indicate, for example, the current time (e.g., "May 11, 2008, 12:00") and the corresponding interior temperature at the time (e.g., "−80 degrees C.") in the channel data 141 in addition to the device number, the device name, etc., corresponding to the cooling storage A. The current time is measured by the timer 12 and, for example, when the cursor is pointed to the icon 1441a, the interior temperature corresponding to the time closest to the current time measured by the timer 12 is read from the channel data 141 and indicated within the balloon 1442a. For example, if the area on the image area 1441 corresponding to a room with the cooling storage A disposed is small and therefore the dimensions of the icon 1441a fitted into the room are small as well, the administrator may view sufficient information related to the cooling storage A through the balloon 1442a, which is not particularly limited by the area. Therefore, the monitoring efficiency is further improved at the time of the centralized monitoring of the cooling storages 2.

For the icon 1441a displayed in the image area 1441, if the display 15 is a color display, when the interior temperature corresponding to the current time in the channel data 141 reaches a warning value defined in advance, a background color exhibits a plurality of different colors, such as yellow and red, depending on a plurality of levels of the warning value. In this embodiment, what level the interior temperature at the current time has reached among the plurality of the levels of the warning value defined in advance is determined by the centralized monitoring apparatus 10 each time the channel information is received and stores the determination result into the storage device 14 as the channel data 141. Therefore, the administrator may easily visually comprehend the presence of abnormality in the operational state of the corresponding cooling storage 2 and the level of the abnormality, if any.

The same applies to an icon 1441b indicative of the cooling storage B depicted in FIG. 8.

The setting of the dimensions, the background colors corresponding to the warning value level, etc., of the icons 1441a and 1441b may be set through the display screen 1400 or another predetermined menu screen (not shown).

Although, for example, the administrator views the operational states of a plurality of cooling storages through a screen of a display in a conventional centralized monitoring apparatus, a plurality of disposition locations of a plurality of the cooling storages in a facility is displayed as text information, for example, symbols, in this screen (if displayed). It is difficult for the administrator to comprehend relationships between the cooling storages and the respective disposition locations, with an increase of the number of the cooling storages 2 to be monitored, resulting in poor monitoring efficiency.

However, since the administrator may visually comprehend the disposition locations in such a way as to look down upon the entire facility with the cooling storages 2 to be monitored disposed in the centralized monitoring apparatus 10 of the embodiment as above, the monitoring efficiency is improved at the time of the centralized monitoring of the cooling storages 2.

OTHER EMBODIMENTS

The above embodiments of the present invention are simply for facilitating the understanding of the present invention and are not in any way to be construed as limiting the present invention. The present invention may variously be changed or altered without departing from its spirit and encompass equivalents thereof.

Although the preservation equipment is the cooling storage 2 in the above embodiment, this is not a limitation. If the preservation equipment is, for example, a culture apparatus, a heater is included as the temperature variable device to heat the inside of a culture chamber to a set temperature (higher than the ambient temperature). The opening of a door of the culture chamber for taking out and putting in a culture has an effect in the direction reducing the temperature of the culture chamber. Therefore, by setting the set temperature of the time zone with small disturbance due to opening/closing of the door, etc., lower than the set temperature of the time zone with large disturbance, the heater may be constrained from operating in the time zone with smaller disturbance (eco-mode operation time zone) in accordance with the set temperature determined on the basis of larger disturbance, for example, and electric power saving may be achieved as a result.

Although the centralized monitoring apparatus 10 is connected to a plurality of the cooling storages 2 in the above embodiment, this is not a limitation and the centralized monitoring apparatus 10 may be connected to the one cooling storage 2 to make up the centralized monitoring system 1, for example.

Although the time zones of the day are divided as two time zones of the eco-mode operation time zone (second time zone) and the normal-mode operation time zone (first time zone) in the above embodiment, the unit time is not limited to one day. The both time zones may be set on the basis of a predetermined period (time) not limited to one day in accordance with the time distribution of disturbance.

For example, seven days of the week may be divided into the days of the eco-mode operation and the days of the normal-mode operation (e.g., the eco-mode operation is performed on Saturday and Sunday and the normal-mode operation is performed on other days of the week). The operation mode may further be determined depending on time zones for each day of the week (e.g., the eco-mode operation is performed from 16 o'clock on Saturday to 34 o'clock Sunday and the normal-mode operation is performed in other periods of the week).

Alternatively, for example, days of the month or the year may be divided into the days of the eco-mode operation and the days of the normal-mode operation (e.g., the eco-mode operation is performed from Day 10 to Day 20 and the normal-mode operation is performed in other days of the month). The operation mode may further be determined depending on time zones for each date (e.g., the eco-mode operation is performed from 0 o'clock to 8 o'clock of Day 10 to Day 15 and 1 o'clock to 9 o'clock of Day 16 to Day 20 and the normal-mode operation is performed in other periods of the month)

The eco-mode data of the above case may include information indicative of days of the week, dates, etc., for defining the eco-mode operation time zone entered through the eco-mode setting screen.

Although the opening/closing of the door causes the disturbance that necessitates the setting of the eco-mode operation time zone in the above embodiment, this is not a limitation. In fact, the disturbance may be any disturbance as long as a predetermined variation trend exists for a relatively long time span (e.g., several hours) depending on the usage environment, the usage pattern, etc., of the preservation equipment.

Although the channels of the vertical axes of the graphs 1430a, 1430b, and 1430c displayed on the display screen 1400 are the cascade temperature, the interior temperature, the ambient temperature, etc., in the above embodiments, this is not a limitation. For example, if the preservation equipment is a culture apparatus, the channels making up the channel data 141 may be concentrations of carbon dioxide, oxygen, etc., or humidity within a culture chamber. This is reflected on the channels of the vertical axes of the graphs 1430a, 1430b, and 1430c displayed on the display screen 1400.

What is claimed is:

1. A centralized monitoring system comprising:
a monitoring apparatus including:

a centralized control device;
a storage device; and
an input device;
a first preservation storage including:
   a first temperature variable device adjusting a temperature inside the first preservation storage; and
   a first control device controlling the first temperature variable device to reach a first set temperature of a first normal-mode, said first control device connected to the centralized control device by a communication line; and
a second preservation storage including:
   a second temperature variable device adjusting a temperature inside the second preservation storage; and
   a second control device controlling the second temperature variable device to reach a second set temperature of a second normal-mode, said second control device connected to the centralized control device by a communication line,
wherein the storage device stores a first starting time information, a first ending time information and a first temperature information inputted through the input device, said first starting time information indicating a starting time of a first eco-mode, said first ending time information indicating a first ending time of the first eco-mode, said first temperature information indicating a first inputted temperature of the first eco-mode,
wherein the storage device further stores a second starting time information, a second ending time information and a second temperature information inputted through the input device, said second starting time information indicating a starting time of a second eco-mode, said second ending time information indicating a second ending time of the second eco-mode, said second temperature information indicating a second inputted temperature of the second eco-mode,
wherein the centralized control device transmits a first starting signal based on the first starting time information and the first inputted temperature to the first control device through the communication line when the first starting time is met, and transmits a first ending signal based on the first ending time information to the first control device through the communication line when the first ending time is met,
wherein the centralized control device further transmits a second starting signal based on the second starting time information and the second inputted temperature to the second control device through the communication line when the second starting time is met, and transmits a second ending signal based on the second ending time information to the second control device through the communication line when the second ending time is met,
wherein the first control device controls the first temperature variable device to adjust the temperature inside the first preservation storage to reach the first inputted temperature of the eco-mode on the basis of the first starting signal and to reach the first set temperature of the normal-mode on the basis of the first ending signal, and
wherein the second control device controls the second temperature variable device to adjust the temperature inside the second preservation storage to reach the second inputted temperature of the eco-mode on the basis of the second starting signal and to reach the second set temperature of the normal-mode on the basis of the second ending signal,
wherein the monitoring apparatus further comprises a display configured to display the first starting time information, the first ending time information, the first temperature information, the second starting time information, the second ending time information, and the second temperature information,
wherein the storage device stores a first image information representative of a plan view of a facility with the first and second preservation storage to be monitored disposed,
wherein the display is configured to display the first image information read from the storage device,
wherein the centralized control device is configured to overlap and display a first icon representative of the first preservation storage and a second icon representative of the second preservation storage to be monitored on the first image information, and
wherein the centralized control device further receives and stores a first detected temperature information indicating a temperatures detected by a first detector from the first preservation storage and second detected temperature information indicating a temperatures detected by a second detector from the second preservation storage into the storage device,
reads the first detected temperature information related to the first preservation storage from the storage device and displays the first detected temperature information on the display when the first icon is selected on the display, and
reads the second detected temperature information related to the second preservation storage from the storage device and displays the second detected temperature information on the display when the second icon is selected on the display.

2. The centralized monitoring system of claim 1, wherein the first inputted temperature of the first eco-mode is higher than the first set temperature of the first normal-mode, and the second inputted temperature of the second eco-mode is higher than the second set temperature of the second normal-mode.

* * * * *